Feb. 25, 1964     K. L. KING     3,121,955
ULTRASONIC DISTANCE SCALING APPARATUS
Filed July 8, 1960     2 Sheets-Sheet 1
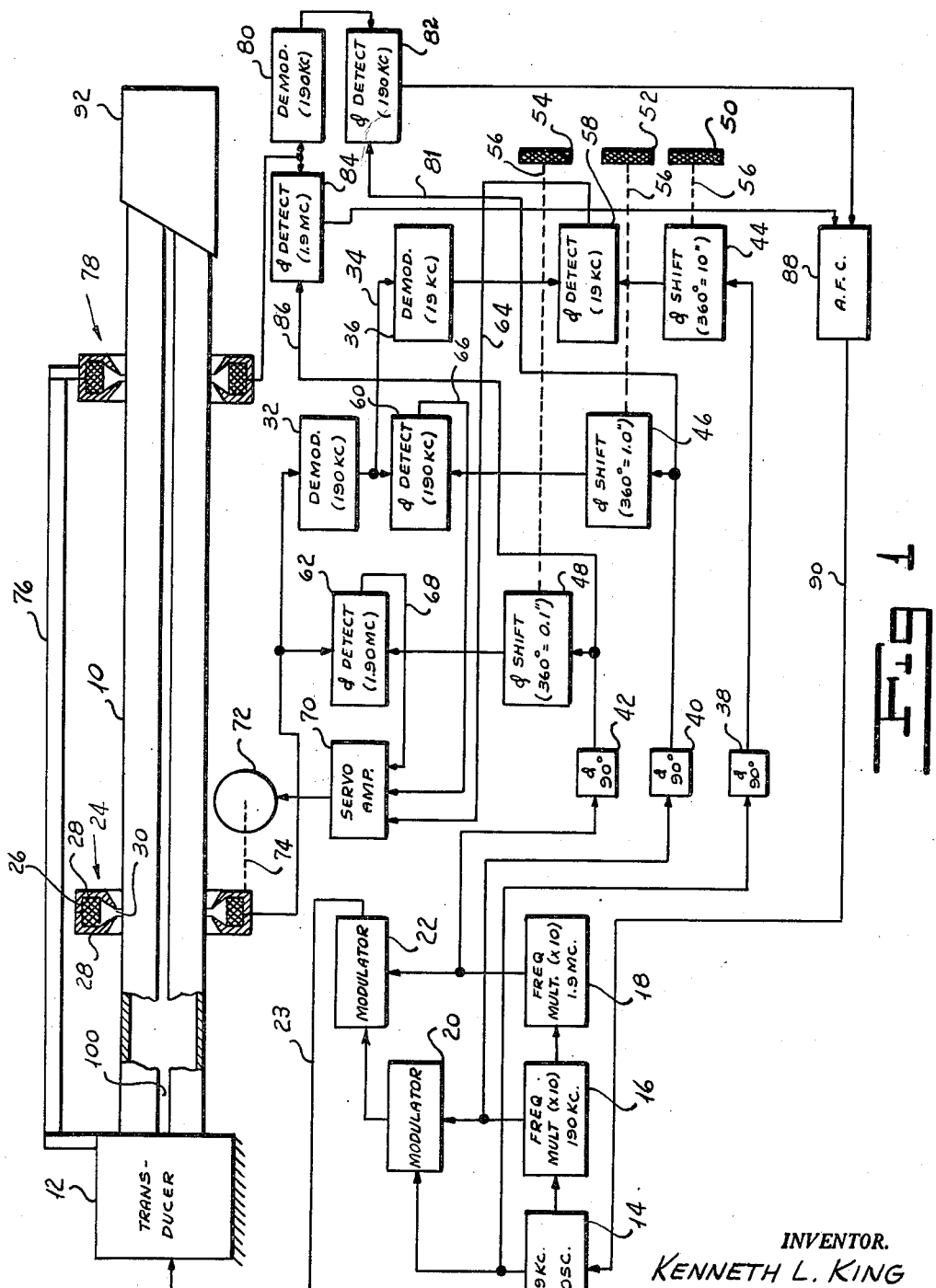
INVENTOR.
KENNETH L. KING
BY
ATTORNEY Feb. 25, 1964 K. L. KING 3,121,955
ULTRASONIC DISTANCE SCALING APPARATUS
Filed July 8, 1960 2 Sheets-Sheet 2
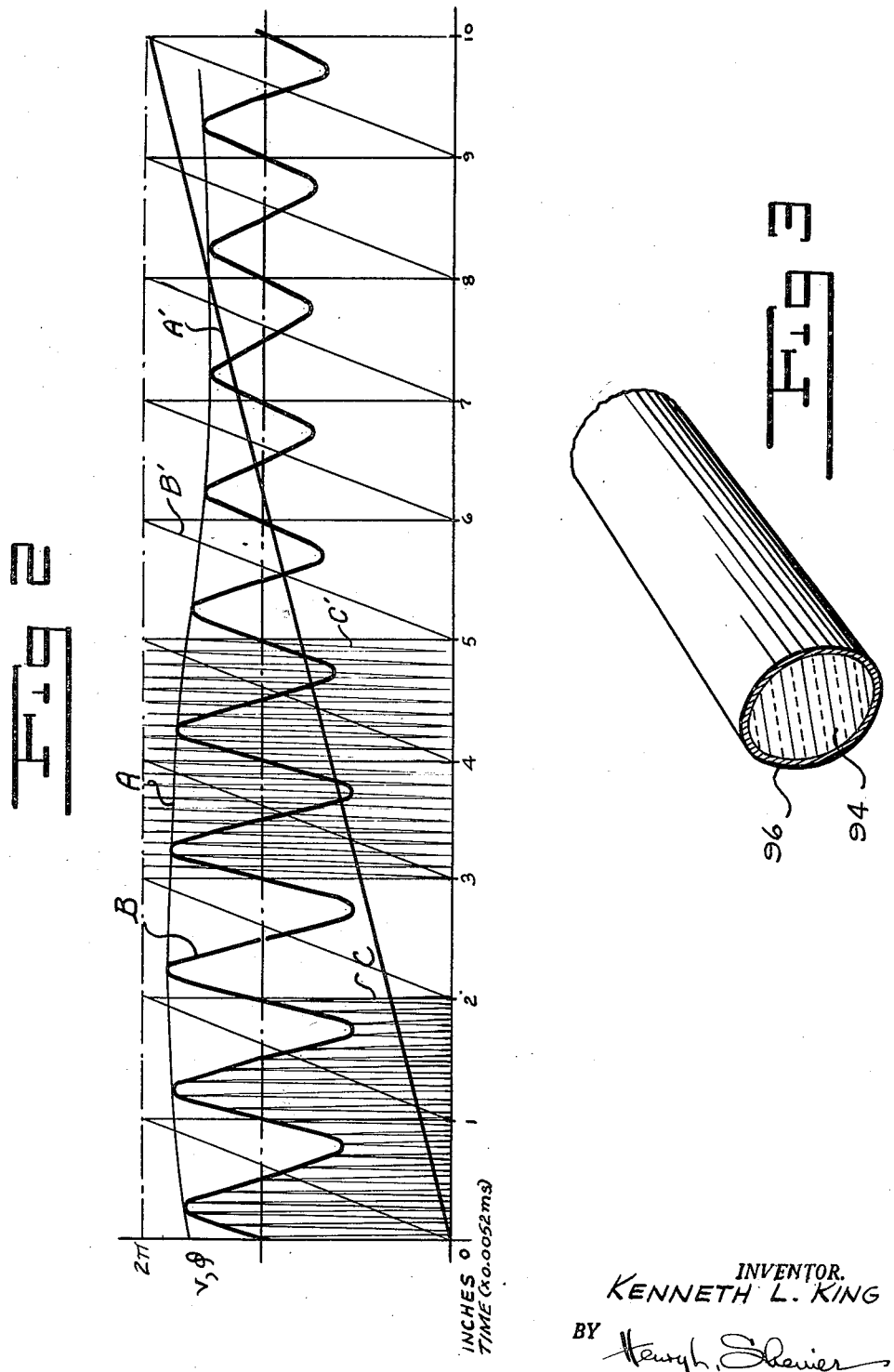
INVENTOR.
KENNETH L. KING
BY
ATTORNEY

United States Patent Office 3,121,955
Patented Feb. 25, 1964

3,121,955
ULTRASONIC DISTANCE SCALING APPARATUS
Kenneth L. King, Eastchester, N.Y., assignor to United Aircraft Corporation, East Hartford, Conn., a corporation of Delaware
Filed July 8, 1960, Ser. No. 41,616
10 Claims. (Cl. 33—1)

My invention relates to an ultrasonic distance scaling apparatus and more particularly to an improved apparatus for translating linear motion to rotary motion.

In the prior art various forms of devices are employed to translate a linear movement into a rotational movement to achieve control. In the machine tool control art, for example, a lead screw or a mechanical rack and pinion are used to convert or translate a linear movement into a rotary movement. If these mechanical devices are to operate with any appreciable degree of accuracy, extremely precise gearing and very accurate machining and locating of parts is necessary. Electrical devices of a digital nature for translating linear movement into rotary movement involve the use of contacts which are subject to wear and which become dirty in use, thus requiring frequent cleaning and replacement after a relatively short period of time.

I have invented an ultrasonic distance scaling apparatus for translating linear motion to rotational motion with a very high degree of accuracy. My apparatus does not require the precise gearing and very accurate machining and locating of parts which are required in mechanical devices of the prior art for translating linear motion to rotary motion. My apparatus does not involve the use of contacts with the result that it needs very little maintenance and has an extremely long life.

One object of my invention is to provide an ultrasonic distance scaling apparatus for translating linear motion to rotational motion with a high degree of accuracy.

Another object of my invention is to provide ultrasonic distance scaling apparatus which does not require the precise gearing or very accurate machining and locating of parts required by mechanical distance scaling apparatus of the prior art.

A further object of my invention is to provide ultrasonic distance scaling apparatus which requires little maintenance and which has an extremely long life.

Other and further objects of my invention will appear from the following description.

In general my invention contemplates the provision of a distance scaling apparatus in which I apply a signal to a length of solid material at a certain point whereby the signal is propagated down the length at the speed of sound in the material. A pickoff device produces an output signal in response to mechanical motion of the material at another point along its length. I provide means for measuring the time delay between the application of the signal and the arrival of the signal at the pickoff point as an indication of the physical distance between the point of application of the signal and the pick-off point. Preferably I measure the time delay by determining the phase difference between a sinusoidal signal of fixed frequency and the delayed signal generated in the pickoff device. In one particular embodiment of my invention I apply to the length a modulated reference signal having a number of component frequencies related by known factors. I separate the resulting pickoff signal into its component frequencies and determine the phase differences between the respective reference signal and pickoff signal components to provide a very accurate measure of distance.

I may employ the distance indicating signal to control the position of the pick-off. I provide my system with means for compensating for the effect of temperature change on the velocity of sound in the length of material.

In the accompanying drawings which form part of the instant specification and which are to be read in conjunction therewith and in which like reference numerals are used to indicate like parts in the various views:

FIGURE 1 is a schematic view of my ultrasonic distance scaling apparatus with a block diagram illustrating the electrical circuit of my apparatus.

FIGURE 2 is a plot showing the relationship between the wave lengths of the vibrations of the scale member of my ultrasonic distance scaling apparatus and showing the change in phase difference between reference signals and magnetostriction voltage components along the length of the scale member.

FIGURE 3 is a perspective view of an alternate form of scale member which may be employed in my ultrasonic distance scaling apparatus.

Referring now to FIGURE 1 of the drawings my ultrasonic distance scaling apparatus includes a scale member 10, which in the particular form of apparatus shown in the figure is a thin-walled tube of a suitable ferromagnetic material such, for example, as nickel. As is known in the art the velocity of vibration propagation in a solid is expressed by the relationship $V = E/P$ where E is Young's modulus for the particular material and P is the density of the material. For a material such as nickel this velocity may be demonstrated to be 15,800 feet per second or approximately 190,000 inches per second.

Let us assume by way of example that a signal having a 19 kc. component is applied to the tube 10. A vibration of this frequency applied to the tube has a wave length of 10 inches. In other words this vibration undergoes 360° of phase change in 10 inches along the length of the tube measured from the point of application of the vibrating force.

It is known that when a rod of ferromagnetic material is subjected to a longitudinal mechanical strain, its state of magnetization changes. Thus when the tube 10 is vibrated in the direction of its axis, the vibration is propagated down the tube 10 at the velocity of sound in the material of which the tube is formed. When the tube is formed of magnetostrictive material, an electromagnetic pickoff may be used. The voltage picked off at a point along the length of the rod is of the same frequency as the frequency of vibration. It will be evident, however, that the phase of the signal picked off at any point along the length of the rod differs from the phase of the signal producing the vibration by an amount which is proportional to the distance of the pick-off point from the point of application of the vibrating force.

I provide my apparatus with a transducer 12 adapted to be energized with an electrical signal for producing longitudinal vibrations in the rod 10. By way of example, assuming I desire control over a distance of 10 inches along the length of the rod 10 with a predetermined accuracy I excite the transducer 12, which may be a magnetostriction transducer or a barium titanate transducer, with a 1.9 mc. signal amplitude modulated with 190 kc. which in turn is amplitude modulated with 19 kc. The wave lengths of vibration components corresponding to these frequencies are respectively 0.1 inch, 1 inch and 10 inches. To generate these frequencies and to apply them to the transducer 12, I couple the output signal of a 19 kc. oscillator 14 to a frequency multiplier 16 of any suitable type known to the art which produces an output signal having a frequency of 190 kc. I apply the output signal of multiplier 16 to a second multiplier 18 which produces an output signal having a frequency of 1.9 mc. I amplitude modulate the output of the 19 kc. oscillator 14 on the output of multiplier 16 by applying the output signals from the oscillator and the multiplier to a modulator 20 of an appropriate type known to the art. I apply the output signal produced by modulator 20 and the output signal of the multiplier 18 to a modulator 22 to produce an output signal which I apply to the transducer 12 through a channel 23. For purposes of clarity in exposition I have illustrated the upper half of the wave form on channel 23 in FIGURE 2. I have correlated the wave form with a length of 10 inches along the tube 10 from the point at which the transducer 12 is connected to the tube. As can be seen by reference to FIGURE 2, the vibration component resulting from the 19 kc. component of the signal on channel 24, which I have represented by the wave form "A" in FIGURE 2, goes through 360° of phase shift throughout the 10 inch length of the tube 10. The signal component having a frequency of 190 kc. represented by the curve B in FIGURE 2 goes through a complete cycle of phase shift in 1 inch along the length of the tube. The vibration corresponding to the 1.9 mc. component of the signal on channel 24 goes through 360° of phase change in one tenth of an inch along the length of the tube or cylinder 10. To avoid confusion I have shown only the portion of the 1.9 mc. component for the first two cycles of the 190 kc. component.

It will readily be appreciated by those skilled in the art that I may, if desired, successively divide a higher frequency signal such as 1.9 mc. to provide the lower frequencies of 190 kc. and 19 kc. The frequencies may be related by factors other than 10. To reduce the required bandwidth of the transducer 12, I have shown the amplitude modulation of the highest frequency by a lower frequency. Thus for the embodiment shown, transducer 12 must pass from 1.691 mc. to 2.109 mc., thus requiring a bandwidth of only 21% approximately.

Referring again to FIGURE 1, my apparatus includes a pick-off device, indicated generally by the reference character 24, which, as will be explained hereinafter, may be carried by the movable element such, for example, as a machine tool element (not shown) to be controlled. Where I desire to sense the mechanical vibration by the provision of magnetostriction material, the device 24 includes a toroidal coil 26 housed in a pair of ferrite cups 28 so constructed as to form a very narrow air gap 30 surrounding the tube 10. Owing to the magnetostriction effect, the mechanical vibration of the tube 10 produces a magnetic field in the ferromagnetic material. As a result the device 24 has induced therein an electrical signal containing all the component frequencies which are applied by the channel 24 to the transducer 12. I apply the signal induced in the pick-off device 24 to a demodulator 32 adapted to separate the 190 kc. wave from the signal. A channel 34 passes the output of the demodulator 32 to a second demodulator 36 which separates the 19 kc. wave from the demodulated 190 kc. ouput from the circuit 32.

Referring again to FIGURE 2 I have shown the variations in phase difference between the reference 19 kc., 190 kc., and 1.9 mc. signals and the corresponding components of the magnetostrictive voltage induced in the pick-off device 24 along the length of the tube 10 by the respective curves A', B', and C'. To avoid confusion I have shown the phase difference curve corresponding to the frequency of 1.9 mc. only over the portion of the tube 10 from 3.0 inches to 5.0 inches.

In one application of my ultrasonic distance scaling apparatus I control the movement of a machine tool member or the like carrying the pick-off 24. To accomplish this result, as is explained in detail hereinafter, I first shift the reference signals from the oscillator 14 and from the multipliers 16 and 18 through angles representing a certain position of the tool and then determine the phase difference between the shifted signals and the components of the magneto-striction signal induced in the device 24. Referring again to FIGURE 1, respective phase shifting networks 38, 40, and 42 apply the outputs of the oscillator 14 and of the multipliers 16 and 18 to respective variable phase shifters 44, 46, and 48. Each of the networks 38, 40, and 42 shifts the signal applied thereto through 90° as is necessary for proper operation of the phase difference detectors as will be explained hereinafter.

Each of the phase shifting networks 44, 46, and 48 is adapted to produce from 0° to 360° of phase shift in the signal input to the network. Thus network 44 can produce an amount of phase shift representing ten inches of length along the cylinder 10, network 46 can produce a shift representing one inch along the length of tube 10 while the network 48 can produce an amount of phase shift representing one tenth of an inch along the length of a tube 10. I provide the respective shifting networks 44, 46, and 48 with manually operable knobs 50, 52, and 54 each of which is adapted to actuate its associated network through a respective linkage 56. From the structure just described it will be seen that by setting the knobs 50, 52, and 54, I can shift the reference signals to represent any particular distance along the length of the tube 10 up to ten inches from the point at which the transducer 12 is connected to the tube.

I apply the respective outputs from the networks 44, 46, and 48 to phase difference detecting networks 58, 60, and 62. The output signal from the pick-off device 24 is applied directly to the phase detecting network 62 while the outputs of the respective demodulators 32 and 36 are applied to the phase difference detecting networks 60 and 58. It will be seen that the respective networks 58, 60, and 62 determine the phase differences between the respective reference signals and the components of the magnetostriction signal generated in the pick-off device 24. These phase difference detecting networks 58, 60, and 62 may be of any suitable type known to the art. In one common type of phase difference detector, the signals are shifted 90° relative to each other prior to their application to the detector for proper operation of the detector. It is for this reason that I pass the reference signals through the networks 38, 40, and 42 before their application to the shifting networks 44, 46, and 48. It will readily be appreciated that the system can be arranged to provide any arbitrary zero position offsetting the phase shifters so that when control knobs 50, 52, and 54 read zero, one or more of phase shifters 44, 46, and 48 respectively are offset from their true zero phase shift position.

In operation of the phase difference detector 58 it produces an output signal which affords a measure of the difference in phase between the phase shifted 19 kc. reference signal and the 19 kc. component of the magnetostriction signal induced in the pickoff device 24. This output of the detecting network 58 also is a measure of the difference between the actual position represented by the position of knob 50. Owing to the inherent limitations in the accuracy of the circuit components, this indication of deviations from desired position is relatively coarse. Phase detecting network 60 produces an output signal representing the difference in phase between the phase shifted 190 kc. reference signal and the 190 kc. component of the magnetostriction signal induced in the pickoff device 24. Since the 190 kc. vibration in the tube 10 passes through a complete cycle of phase change in 1 inch of length of the tube, the 190 kc. system has an accuracy of the order of 10 times the accuracy of the 19 kc. system. The phase detecting network 62 produces an output signal representative of the phase difference between the phase shifted 1.9 mc. reference signal and the 1.9 mc. component of the magnetostriction voltge in the pickoff coil 26. Owing to the fact that the 1.9 mc. vibration in the tube 10 passes through a complete cycle of phase change in one tenth of an inch of length along the tube 10, this 1.9 mc. system is substantially ten times as accurate as is the 190 kc. system.

Respective channels 64, 66, and 68 apply the output or error signals from the detectors 58, 60, and 62 to a servomotor amplifier 70 which supplies the excitation voltage for a servomotor 72. In response to signals from the amplifier 70, the motor 72 drives the element such, for example, as a machine tool member to the position represented by the settings of the knobs 50, 52, and 54. When the pick-off device 24 carried by the control element arrives at the position represented by the settings of the knobs 50, 52, and 54, the respective phases of the components of the magnetostriction voltage induced in the pick-off device 24 are the same as the phases of the shifted reference signals with the result that the outputs of all the phase detectors 58, 60, and 62 are zero and the motor stops. We have indicated the connection between the motor 72 and the pick-off device 24 schematically by the broken line 74 in FIGURE 1.

It will be appreciated that upon the occurrence of a change in temperature the velocity of sound along the tube changes. I provide my system with a means for compensating for such temperature change to prevent the change from adversely affecting the operation of my device. A bar 76 of a material such as Invar having a very low temperature coefficient of expansion connects a stationary pick-off device, indicated generally by the reference character 78, to the housing of the transducer 12. The length of the bar 76 is equal to that distance over which I desire control. In the particular example considered above, the pick-off device 78 is positioned at a distance of 10 inches from the point at which the transducer 12 applies the vibrating force to the tube 10.

I apply the magnetostriction signal induced in the device 78 to a demodulator 80 which operates to separate the 190 kc. component from the signal induced in the device 78. I apply the output of demodulator 80 to one input terminal of a phase detector 82, the other input terminal of which is supplied with the 190 kc. reference through a channel 81. I apply the magnetostriction signal induced in the device 78 directly to one terminal of a phase detector 84 which operates at 1.9 mc.; a channel 86 applies the 1.9 mc. reference signal to the other terminal of the phase detector 84. I apply the outputs from both the phase detectors 82 and 84 to the input terminals of an automatic frequency control circuit 88 of any suitable type known to the art. A channel 90 applies the output from the frequency control circuit 88 to the oscillator 14 to control the frequency of the latter.

It will be appreciated that with the pick-off device 78 positioned at a distance of 10 inches from the point of application of the vibrating force to the tube 10, the phases of the components of the magnetostriction voltage induced in the pick-off device 78 will be precisely the same as those of the reference signals with the result that the outputs of both phase detectors 82 and 84 are zero. If now a change in temperature occurs to produce a change in the velocity of sound travelling along the length of tube 10, then the phases of the voltage components induced in the pick-off device 78 are no longer the same as the phases of the reference signals. As a result of this condition the phase detectors 82 and 84 produce outputs to cause the automatic frequency control circuit 88 to change the frequency of the oscillator 14 in such a direction as causes the phases of the reference signals to be equal to the phases of the components of the magnetostriction voltage induced in the pick-off device 78. It will be seen that I employ only the two higher frequency components to compensate for the effect produced by a change in temperature. I have discovered that an appreciable change in temperature does not produce an error in the lowest frequency which is of a magnitude sufficient to affect the accuracy of my apparatus to a significant degree.

I apply a termination 92 to the end of the cylinder or tube 10 remote from the transducer 12. This termination is formed of a suitable material such, for example, as a rubber compound which is molded on the end of the tube 10 to prevent reflections from the end of the tube. I so form this termination 92 as to provide a tapering contact with the end of the tube. As will be appreciated by those skilled in the art, the voltage standing wave ratios will then be substantially unity thereby eliminating the nodes of zero voltage when standing waves exist.

It is essential for proper operation of my distance scaling apparatus that eddy currents generated in the magnetostrictive material making up the tube 10 be held to as low a value as is possible. For this reason I form the tube 10 with an extremely thin wall and provide the tube with a slit 100 extending in the direction of the tube length.

Referring now to FIGURE 3, in an alternate form of magnetostriction member which may be employed in my distance scaling apparatus I coat a quartz rod 94 with a layer 96 of ferromagnetic material such, for example, as nickel. The layer 96 may be built up by any suitable method such, for example, as by electroplating. In this form of my invention the frequency of the vibration is determined by the quartz and the layer 96 of nickel serves only to provide the magnetostriction electrical output. One advantage of this form of my invention over that shown in FIGURE 1 is that it is less affected by changes in temperature owing to the low temperature coefficient of expansion of quartz.

In operation of my ultrasonic distance scaling apparatus, I will assume that I wish to position a member such, for example, as a machine tool worktable at a particular location with respect to a reference point which is the point at which the vibrating force is applied to the tube 10. For example, I will assume that I wish to position the table at a distance of 2.879 inches from the reference point. To accomplish this result, I set the knob 50 at the 2.8 position; I set the knob 52 at the .87 position; and I set the knob 54 at the .079 position. It will be noted that in each case I set the particular dial to a position corresponding not only to the digit in the place of significance to which that dial corresponds but to a position which also includes the digit of most significance in the next lower order place of significance. This is necessary in order that ambiguities will be avoided which otherwise may occur as the system drives toward a null. That is, if a position of 5.75, for example, were commanded and the most significant knob 50 were set at 5.0 then the system might well drive toward the 4.75 position rather than the 5.75 position as desired.

With the particular dial settings outlined above, the 19 kc. indicator 58 produces an output signal representing the difference in phase between the phase shifted 19 kc. reference signal and the 19 kc. component of the magnetostriction signal induced in the pick-off device 24. This output signal represents the displacement of the worktable carrying the device 24 from the commanded 2.8 inch position represented by the setting of knob 50. Under the influence of this signal, motor 72 drives the table and the device 24 toward the 2.8 inch position. The 190 kc. indicator 60 produces an output signal representative of the displacement of the table from the .87 position within the range of positions from 2 inches to 3 inches as commanded by the setting of knob 52. Under the influence of this signal the servomotor 72 drives the table and the pick-off device 24 toward the .87 position within the range of positions from 2 inches to 3 inches. The 1.9 mc. detector 62 produces an output signal which represents the displacement of the table and the pick-off device 24 from the .079 position within the range of positions from 2.8 inches to 2.9 inches. Under the action of this signal, the servomotor 72 drives the table and the pick-off device 24 until the table reaches the commanded 2.879 inch position from the reference position. When the table arrives at this position, the outputs of the phase detectors 58, 60, and 62 all are zero and the servomotor 72 is not energized.

Upon the occurrence of a change in temperature which results in a change in the velocity of sound travelling along the length of the tube 10 from the point at which the transducer 12 applies the vibrating force to the pick-off device 78, the two phase detectors 82 and 84 produce output signals which actuate the automatic frequency control circuit 86 to regulate the frequency of the oscillator 14 until the outputs from the detectors 82 and 84 are zero. While I have shown and described a particular form of my ultrasonic distance scaling apparatus in which three frequencies and a tube length of 10 inches are used, it will be seen that I may, if desired, use a tube of any length and I may employ more than three frequencies, if desired.

It will be seen that I have accomplished the objects of my invention. I have provided an ultrasonic distance scaling apparatus which converts linear displacement into rotary displacement without the use of mechanical parts which require accurate machining and location of parts. My apparatus employs no contacts and thus is not subject to the disadvantages such as dirt and wearing of systems which employ contacts. My apparatus provides an extremely rugged and reliable means for positioning a controlled member such as a machine tool element with a high degree of accuracy.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Distance scaling apparatus including in combination a length of solid material, means for impressing a mechanical motion upon said length at a first point, the motion being propagated along the length at the speed of sound in said material, means positioned at a second point along the said length for detecting mechanical motion of said material at said second point, means responsive both to said detecting means and to said impressing means for producing an electrical signal as a function of the propagation time interval between the first point and said second point as an indication of the distance between the two points, a first channel coupling said impressing means to said material at said second point, means responsive both to said detecting means and to said impressing means for means for introducing a variable phase shift into one of said channels.

2. Distance scaling apparatus including in combination a length of material, means adapted to be energized to vibrate said length at a first point, a source of a reference signal of a fixed frequency, means for energizing said vibrating means from said source to propagate said vibration along said length at the speed of sound in said material, means positioned at a second point along said length adapted to produce a signal in response to said vibration, means for shifting the phase of said reference signal, means for comparing said reference signal shifted in phase and said pick-off signal to produce an error signal as a function of the phase difference between said pick-off signal and said reference signal shifted in phase and means responsive to said error signal for moving said pick-off device to a position along said length to reduce said error signal to zero.

3. Distance scaling apparatus including in combination a length of material, means adapted to be energized to vibrate said length at a first point, a plurality of sources of reference signals having respective frequencies related by predetermined factors, means responsive to said sources for energizing said vibrating means to produce a vibration propagated along said length at the speed of sound in said material, a pick off positioned along said length at a second point and adapted to produce a signal in response to said vibration, means for resolving said pick-off signal into component signals corresponding to said respective frequencies and means for comparing said component signals with said source signals of corresponding frequencies to determine the respective phase differences.

4. Distance scaling apparatus including in combination a length of material, means adapted to be energized to vibrate said length at a first point, a plurality of sources of reference signals having respective frequencies related by predetermined factors, means responsive to said sources for energizing said vibrating means to produce vibration propagated along said length at the speed of sound in said material, a pick off device positioned along said length at a second point and adapted to produce a signal in response to said vibration, means for resolving said pick-off signal into component signals corresponding to said respective frequencies, means for shifting the phase of said reference signals, means for comparing said component signals with the reference signals of corresponding frequencies shifted in phase to produce error signals proportional to the phase difference between the component signals and the respective reference signals of corresponding frequencies shifted in phase and means responsive to said error signals for moving said pick-off device to a position along said length to reduce said error signals to zero.

5. Distance scaling apparatus including in combination a length of material, means adapted to be energized to vibrate said length of material at a first point, a source of a reference signal of a fixed frequency, means for energizing said vibrating means from said source to produce a vibration propagated along said length at the speed of sound in said material, a pick-off device positioned at a second point along said length and adapted to produce a signal in response to vibration, means for shifting the phase of said reference signal by an amount representing a desired position of said pick-off device along said length, means for determining the phase difference between said phase shifted reference signal and said pick-off signal to produce an error signal representing the displacement of said pick-off device from said desired position and means responsive to said error signal for moving said pick-off device to said desired position.

6. Distance scaling apparatus including in combination a length of material, means adapted to be energized to vibrate said length of material at a first point, a plurality of sources of reference signals having respective frequencies related by predetermined factors, means responsive to said sources for energizing said vibrating means to produce a vibration propagated along the said length at the speed of sound in said material, a pick-off device positioned at a second point along said length and adapted to produce a signal in response to said vibration, means for resolving said pick-off signal into component signals corresponding to said respective frequencies, means for shifting the phase of the respective reference signals by amounts corresponding to a desired position of said pick-off device, means for comparing said phase-shifted reference signals with said pick-off component signals to produce error signals and means responsive to said error signals for driving said pick-off device to said desired position.

7. Distance scaling apparatus including in combination a length of material, means adapted to be energized to vibrate said length of material at a first point, a source of a reference signal of a certain frequency, means responsive to said source for energizing said vibrating means to produce a vibration propagated along said length at the speed of sound in said material, a pick-off device positioned at a second point along said length and adapted to produce a signal in response to said vibration, means for determining the phase difference between said reference signal and said pick-off signal as a measure of the distance between said points, a stationary pick-off device positioned at a fixed point along said length to have a signal produced therein and means responsive to said stationary pick-off signal for regulating the frequency of said reference signal.

8. In distance scaling apparatus having a length of material and having means for vibrating said length in response to a reference signal to produce a vibration propagated along said length at the speed of sound in said material, a temperature compensating arrangement including a stationary pick off positioned at a predetermined point along said given length and adapted to produce a signal in response to said vibration and means responsive to said pick-off signal for controlling the frequency of said reference signal.

9. Distance scaling apparatus including in combination a hollow tube of magnetostrictive material formed with a slit extending along its length, means adapted to be energized to vibrate said tube, a source of a reference signal of a fixed frequency, means responsive to said source for energizing said vibrating means to produce a vibration propagated along said length at the speed of sound in said material, a pick-off device positioned at a second point along the length of said tube and adapted to produce a voltage in response to the magnetic field generated by said vibration and means for determining the phase difference between said reference signal and said pick-off signal.

10. Distance scaling apparatus including in combination a rod formed of a material having a low temperature coefficient of expansion, a layer of magnetostrictive material carried by said rod, means adapted to be energized to vibrate said rod, a source of a reference signal of a fixed frequency, means responsive to said source for energizing said vibrating means to produce a vibration propagated along said rod at the speed of sound in said rod material, a pick-off device positioned at a second point along the length of said rod and adapted to produce a signal in response to the magnetic field generated by said vibration and means for determining the phase difference between said signals as a measure of the distance between said points.

References Cited in the file of this patent
UNITED STATES PATENTS

| | | |
|---|---|---|
| 2,394,455 | Koch | Feb. 5, 1946 |
| 2,401,094 | Nicholson | May 28, 1946 |
| 2,461,543 | Gunn | Feb. 15, 1949 |
| 2,542,627 | Chevallier | Feb. 20, 1951 |
| 2,612,772 | McConnell | Oct. 7, 1952 |
| 2,680,837 | Sensiper | June 8, 1954 |
| 2,870,389 | Fraser | Jan. 20, 1959 |
| 2,907,939 | Sant Angelo | Oct. 6, 1959 |
| 2,947,929 | Bower | Aug. 2, 1960 |
| 2,956,344 | Rantsch | Oct. 18, 1960 |
| 2,985,018 | Williams | May 23, 1961 |

UNITED STATES PATENT OFFICE
CERTIFICATE OF CORRECTION

Patent No. 3,121,955                  February 25, 1964

Kenneth L. King

It is hereby certified that error appears in the above numbered patent requiring correction and that the said Letters Patent should read as corrected below.

Column 7, lines 48 and 49, for "said material at said second point, means responsive both to said detecting means and to said impressing means for" read -- said signal producing means, a second channel coupling said detecting means to said signal producing means and --.

Signed and sealed this 30th day of June 1964.

(SEAL)
Attest:

RNEST W. SWIDER
Attesting Officer

EDWARD J. BRENNER
Commissioner of Patents